(No Model.)

F. EGGE.
SHEET METAL CHAIN.

No. 417,007.  Patented Dec. 10, 1889.

Witnesses
T. W. Gillhuley
S. Williamson.

Inventor
Frederick Egge
By J. M. Smith Jr.
Atty.

UNITED STATES PATENT OFFICE.

FREDERICK EGGE, OF BRIDGEPORT, CONNECTICUT, ASSIGNOR TO THE SMITH & EGGE MANUFACTURING COMPANY, OF SAME PLACE.

SHEET-METAL CHAIN.

SPECIFICATION forming part of Letters Patent No. 417,007, dated December 10, 1889.

Application filed April 12, 1889. Serial No. 307,019. (No model.)

*To all whom it may concern:*

Be it known that I, FREDERICK EGGE, a citizen of the United States, residing at Bridgeport, in the county of Fairfield and State of Connecticut, have invented certain new and useful Improvements in Sheet-Metal Chains; and I do hereby declare the following to be a full, clear, and exact description of the invention, such as will enable others skilled in the art to which it appertains to make and use the same.

My invention relates to sheet-metal chains, and has for its object to decrease the wear on the chain, and at the same time to prevent the latter from becoming kinked.

With these ends in view my invention consists in forming the bearing parts of the loops of the links convexo-concave in horizontal section and in shaping the rear or bearing parts of the eyes of the links to conform to the convexity of the loops.

Figure 1:
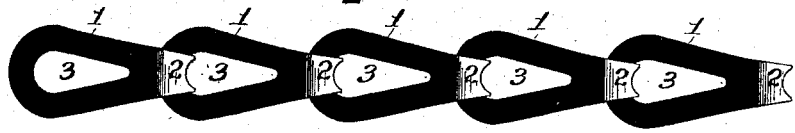
Figure 2:
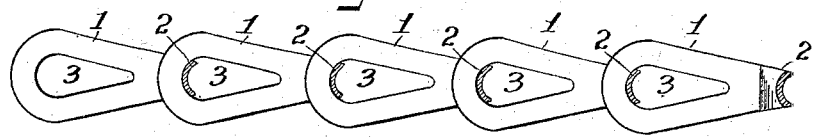
Figure 3:
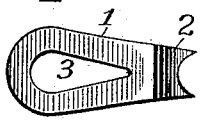

Referring to the accompanying drawings, Figure 1 is a plan showing a short section of chain made of links constructed in accordance with my improvement; Fig. 2, a horizontal section of said chain, and Fig. 3 a detail view of a single link.

Similar numerals denote like parts in the several figures.

1 are the links, 2 the loops, and 3 the eyes.

The chain shown is such as is commonly known in the market as "Smith & Egge sash-chain," and the end aimed at is to so join the links that there shall be no angular or abrupt wearing-points, such as are liable to kink the chain or cause the stock of the links to be twisted or cut through.

Instead of forming the ends of the loop 2 straight in horizontal section, I shape them convexo-concave, the convexity being on the inside of the loop and constituting the bearing-surface of said loop within the eye of the preceding link. The rear or bearing surfaces of the eyes 3, I shape in a continuous curve, to conform to the convexity of the loops, so that when the links are assembled the contact-surfaces of said eyes and loops will be in such relation that the links may be swung in any direction without the slightest catch or kink. In fact, my invention embodies all the advantages of a ball-and-socket joint as far as the perfect fitting and smooth action of the links one within the other is concerned.

I claim—

1. A sheet-metal chain composed of links having loops convexo-concave in horizontal section and eyes corresponding therewith, substantially as set forth.

2. In a sheet-metal chain composed of a series of interlooped links, the loops having their forward or bearing ends convexo-concave in horizontal section, in combination with the eyes whose rear or bearing surfaces are conformed to said convexity, substantially as set forth.

In testimony whereof I affix my signature in presence of two witnesses.

FREDERICK EGGE.

Witnesses:
RICHARD H. BRODERICK,
JOHN H. GREEN.